(12) United States Patent
Eren et al.

(10) Patent No.: US 12,387,084 B1
(45) Date of Patent: Aug. 12, 2025

(54) MACHINE LEARNING TECHNIQUES FOR GENERATING PREDICTIONS BASED ON INCOMPLETE DATA

(71) Applicant: PROS, INC., Houston, TX (US)

(72) Inventors: Ezgi Eren, Bellaire, TX (US); Jiabing Li, Fulshear, TX (US); Jonas Rauch, Mannheim (DE); Zhaoyang Zhang, Richmond, TX (US); Royce Kallesen, Friendswood, TX (US); Ravi Kumar, Houston, TX (US)

(73) Assignee: PROS, Inc., Houston, TX (US)

( * ) Notice: Subject to any disclaimer, the term of this patent is extended or adjusted under 35 U.S.C. 154(b) by 21 days.

(21) Appl. No.: 18/622,207

(22) Filed: Mar. 29, 2024

(51) Int. Cl.
*G06N 3/04* (2023.01)
*G06N 3/084* (2023.01)

(52) U.S. Cl.
CPC ............... *G06N 3/04* (2013.01); *G06N 3/084* (2013.01)

(58) Field of Classification Search
None
See application file for complete search history.

(56) References Cited

U.S. PATENT DOCUMENTS

| | | | | |
|---|---|---|---|---|
| 7,865,420 B1 * | 1/2011 | Daman | ................... | G06Q 30/08 705/37 |
| 10,748,087 B2 * | 8/2020 | Fox | .................... | G06Q 10/0631 |
| 10,755,207 B1 * | 8/2020 | Fox | ........................ | G06Q 10/04 |
| 2008/0313101 A1 * | 12/2008 | Helander | ........... | G06Q 30/0283 705/400 |
| 2017/0103437 A1 * | 4/2017 | Guillard | ............... | G06Q 10/087 |
| 2020/0057918 A1 * | 2/2020 | Shin | ...................... | G06F 18/214 |

OTHER PUBLICATIONS

Budiarto et al., Revenue management of air cargo service in theory and practice, IOP Conf. Series: Earth and Environmental Science 158 (2018) 012022, Total pp. 14 (Year: 2018).*
Van Ryzin et al., "Revenue Management Without Forecasting or Optimization: An Adaptive Algorithm for Determining Airline Seat Protection Levels", Management Science © 2000 INFORMS, vol. 46, No., Jun. 6, 2000, pp. 760-775.

(Continued)

*Primary Examiner* — Alan Chen
(74) *Attorney, Agent, or Firm* — Womble Bond Dickinson (US) LLP

(57) ABSTRACT

Techniques for training a prediction model are disclosed. An example method includes processing historical event data comprising a plurality of computer-readable events for a resource to determine previous parameters for the resource. The method also includes generating training data for training the prediction model without using a forecast for future utilization of the resource. The training data comprises a set of proxies generated from previous parameters for the resource. Each proxy is associated with a remaining capacity of the resource and a remaining time to expiration of the resource. The method also includes training the prediction model to generate a mapping from the remaining capacity of the resource and the remaining time to expiration of the resource to the proxy. The method also includes receiving a request that describes a potential future event pertaining to the resource and generating a prediction for the potential future event using the prediction model.

15 Claims, 8 Drawing Sheets

(56) References Cited

OTHER PUBLICATIONS

Ball et al., "Toward Robust Revenue Management: Competitive Analysis of Online Booking", Operations Research, Jul.-Aug. 2009, vol. 57, No. 4, pp. 950-963.
Will (Wei) Ma, "Dynamic, Data-Driven Decision-Making in Revenue Management", Sloan School of Management, Massachusetts Institute of Technology, Jul. 15, 2018, 365 pages.
Chen et al., "Simple Policies for Dynamic Pricing With Imperfect Forecasts", 38 pages.
Ata et al., "On Bid-Price Controls For Network Revenue Management", Stochastic Systems, 2015, vol. 5, No. 2, pp. 268-323.
Akan et al., "Bid-Price controls for Network Revenue Management: Martingale Characterization of Optimal Bid Prices", Mathematics of Operations Research, vol. 34, No. 4, Nov. 2099, pp. 912-936.
Stefanus Jasin (2015) Performance of an LP-Based Control fo Revenue Management with Unknown Demand Parameters. Operations Research 63(4):909-915. https://doi.org/10.1287/opre.2015.1390.
Bertsimas et al., "Data-Driven Learning in Dynamic Pricing Using Adaptive Optimization", Operations Research—MIT Sloan School of Management, Cambridge MA, 50 pages.
Perakis et al., "Robust Controls for Network Revenue Management", Sloan School of Managemet, MIT, E53-E359, Cambridge MA and Anderson School of Management, UCLA, B511, Los Angeles CA, 43 pages.
Eren, et al., "Revenue management without demand forecasting: a data-driven approach for bid price generation," https://doi.org/10.1057/s41272-023-00465-3, Journal of Revenue and Pricing Management, 18 pages.

\* cited by examiner

Algorithm 1 Observation Building for Data-Driven Bid Price Generation

--- input: historical pricing and time-to-departure data, $P$ and $T$, capacity bound, $C$, set of flights $I$, set of DCPs, $D = [d_1, d_2, \ldots, d_{|D|}]$ set $\tilde{P} \leftarrow []$
for $i \in I$ do:
    set $\tilde{P}^i \leftarrow []$
    for $d_j \in D$ do:
        set $P^i_{\leq d_j} \leftarrow \{P^i_n | T^i_n \leq d_j\}, \tilde{P}^i_{\leq d_j} \leftarrow []$
        $E \leftarrow \emptyset$
        for $k = 1 : |P^i_{\leq d_j}|$ do:
$$\tilde{P}^i_{\leq d_j}(k) \leftarrow \max\left(P^i_{\leq d_j} \setminus E\right)$$
$$E \leftarrow E \cup \left\{\max\left(P^i_{\leq d_j} \setminus E\right)\right\}$$
        end for
        for $k = |P^i_{\leq d_j}| + 1 : C$ do:
        $\tilde{P}^i_{\leq d_j}(k) \leftarrow 0$
        end for
        $\tilde{P}^i \leftarrow \left[\tilde{P}^i; \tilde{P}^i_{\leq d_j}\right]$
    end for
end for

---

Fig. 3

MACHINE LEARNING TECHNIQUES FOR GENERATING PREDICTIONS BASED ON INCOMPLETE DATA

TECHNICAL FIELD

Aspects of the present disclosure relate to machine learning techniques for generating predictions based on incomplete data. Specific aspects relate to techniques for training a machine learning model.

BACKGROUND

Computing systems utilized by organizations can be programmed to help organizations develop optimal pricing strategies for maximizing revenue and profits. However, such computing systems may not always have access to sufficient data to make accurate predictions. For example, in revenue management computing systems for perishable resources with a limited supply, the opportunity cost of remaining capacity is an important input into determining an optimal price. The opportunity cost of capacity quantifies the expected potential future revenue opportunity lost from giving up a unit of capacity at any given time by accepting a booking to reserve that capacity. One example where opportunity cost of capacity becomes a factor, is in setting prices for a limited number of passenger seats on a flight for an airline company, as passengers reserve capacity ahead of flight departure time. In such an example, the seat capacity is not only limited, but also perishable, as any remaining seats beyond the time of departure would be of zero value, i.e. no revenue opportunity is attached to any un-booked seats beyond departure time.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a pseudocode representation of the observation building algorithm used to generate an opportunity cost proxy for training an opportunity cost model.

DETAILED DESCRIPTION

Figure 1:
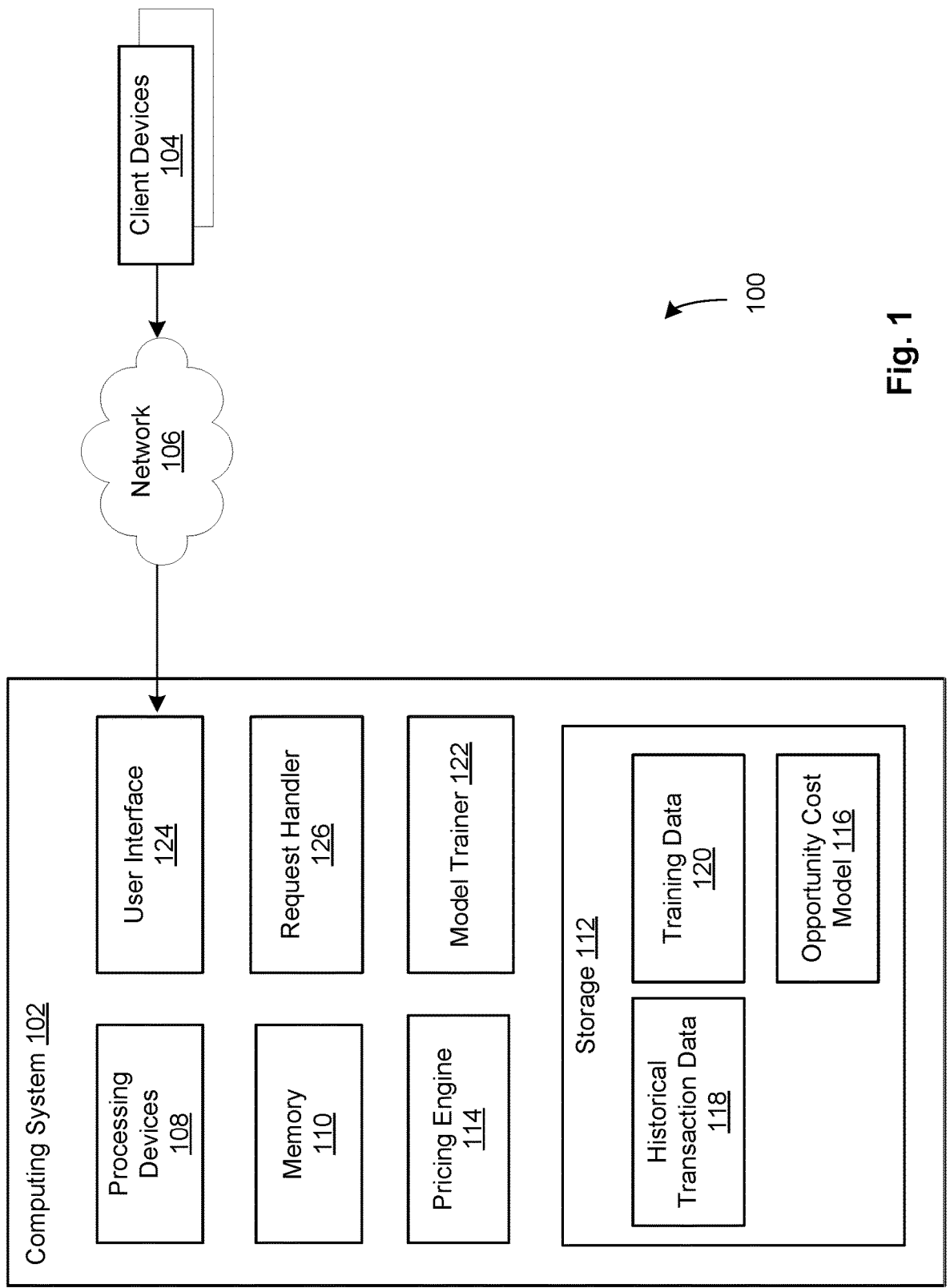
FIG. 1 is a block diagram of an example system in accordance with some embodiments of the present disclosure.

The present disclosure relates to machine-learning techniques for generating predictions based on incomplete data. Some embodiments describe machine-learning techniques that can be used in revenue management computing systems to generate opportunity cost predictions. Opportunity cost of remaining capacity can be an important input into determining an optimal price for a resource if the resource is in limited supply and perishable. The opportunity cost of capacity is dependent on remaining capacity levels for the resource since the resource becomes more valuable as it becomes scarcer. The opportunity cost of capacity also depends on the time remaining to the perishability of the supply, since resources that remain unsold past the date of perishability (e.g., flight departure date) generate no revenue.

The opportunity cost of capacity also depends on anticipated demand as well as willingness-to-pay of customers, since these factors will determine the likelihood of future bookings and the expected future value of the resource. However, anticipated demand and willingness-to-pay of customers are unknown values. Accordingly, conventional computing systems for estimating opportunity cost of remaining capacity rely on demand forecasting where demand distribution parameters are estimated from historical transactions and forecasted as a function of alternative pricing or price points. The forecasted demand and future capacity are then fed into an optimization system, where optimal pricing is computed based on the given demand and capacity constraints.

Demand forecasting is a well-established approach with proven performance when certain assumptions and data requirements are met. For example, demand forecasting requires a large amount of historical transaction data, usually long enough to capture repetitive (e.g., seasonal) patterns. As the historically observed demand is already a function of historical pricing, availability, and capacity limits, demand forecasting from the historical transaction data usually includes an unconstraining process. Unconstraining (also known as uncensoring) is used to process historical transaction data to estimate an unconditional demand, which is a demand function that can be used to determine demand as a function of alternative pricing. Hence, for the entire timespan of historical transaction data used, the corresponding historical pricing and/or availability will also be needed. This usually corresponds to a vast amount of data, which is often not readily available if the industry or company is relatively new to the practice of revenue management. In cases where prices change very frequently, are highly differentiated depending on the context, or are negotiated on a per transaction basis it might be entirely infeasible to keep a history of all available prices. Future resource capacity (e.g., schedule data for airlines) is another data component used in price optimization. However, future resource capacity can be quite uncertain and variable for some industries where capacity is moveable (e.g., car rental) and/or hard to estimate.

In addition to extensive data requirements, the demand forecasting approach usually involves strict assumptions about demand predictability. However, such assumptions may not be valid for industries that face high demand volatility, such as air cargo. Even when demand patterns are generally predictable, the demand estimation process may be susceptible to external demand shocks, which are sharp, sudden changes in demand or demand patterns. Demand shocks generally occur when there is a sudden unforeseen change in the market due, for example, to a new competitor entering the market, a local or global pandemic, or other unforeseen events. Such events may cause sharp changes to demand intensity, willingness-to-pay of customers, booking patterns, and other effects. Accordingly, computing systems that perform demand forecasting based on historical data may not be able to quickly self-correct in the face of sharp, unexpected market changes, resulting in a systemic bias in the demand forecast.

If inaccurate demand forecasts are used to set pricing decisions or to determine whether to accept or reject future incoming demand, the systemic bias in the demand forecast may result in lost bookings and/or lost revenue due to non-optimal pricing and decision making. If these suboptimal transactions are then incorporated into the historical transaction data and used to predict future demand, it could create a continuous feedback loop that results in a vicious cycle of deteriorating forecast accuracy and revenue loss. An example of this is a spiral down effect seen on pricing in the case of systemic low bias in demand forecast.

Embodiments of the present disclosure address the above-noted and other deficiencies by providing a system that uses improved modeling techniques to generate predictions based on incomplete data. Example embodiments disclosed herein relate to techniques for training a prediction model to estimate opportunity cost of remaining capacity without the use of a demand forecast. In accordance with embodiments described herein, an opportunity cost model is trained to generate an opportunity cost for a transaction as a function of remaining capacity and remaining time. In accordance with embodiments described herein, the opportunity cost model may be generated by training an artificial intelligence model or other type of machine learning model such as an artificial neural network.

The opportunity costs model may be trained on a body of training data derived from a set of historical transaction data. In most cases, the historical transaction data will not have any record of the opportunity costs of transactions but will include the pricing and quantity booked by each transaction. In place of actual opportunity costs, the transaction prices are transformed into an opportunity cost proxy, which is used as the ground truth observational data for training the opportunity costs model to infer opportunity costs for future transactions. The opportunity cost proxy is generated based on the assumption that the actual transaction prices over time for a specific resource provide a good approximation of the opportunity costs for that resource. As explained further below, the historical transaction data is processed to create an opportunity cost proxy as a function of remaining capacity and remaining time to perishability, also referred to herein as time to expiration of the resource. The process of generating the opportunity cost proxy may be referred to as observation building. The generated opportunity cost observations are then used to train the opportunity cost model, which is then able to infer an opportunity cost estimation for future transactions. Once generated, the opportunity cost of the remaining capacity can be used in downstream processes, for example, to set pricing decisions. As a rule of thumb, higher opportunity costs imply higher prices and vice versa.

The techniques described herein addresses the challenges that come with conventional two-step approach of demand forecasting followed by optimization. In accordance with the disclosed techniques, a historical proxy of opportunity cost as a function of remaining capacity and time to expiration is generated directly from the historical transactions, thereby eliminating the need for demand forecasting and the validation of demand assumptions. The elimination of demand forecasting also reduces the reliance on the complex and compute intensive mathematical optimization techniques involved, resulting in a more efficient use of computing resources. The elimination of demand forecasting also alleviates the amount of data required to process recommendations, resulting in less storage space usage and less network traffic. The disclosed techniques are also robust to demand shocks due to the elimination of demand forecasting combined with sensitivity to deviations from historical trends. The flexibility it brings to the opportunity cost generation process in terms of data requirements, demand assumptions, and relative ease of implementation makes the opportunity cost generation process accessible to industries that face demand volatility or do not meet strict data requirements of the conventional approach. It will be appreciated that the techniques described herein may also be used to predict other parameters related to potential future events pertaining to a resource.

FIG. 1 is a block diagram of an example system 100 in accordance with some embodiments of the present disclosure. One skilled in the art will appreciate that other architectures are possible for system 100 and any components thereof, and that the implementation of a system utilizing examples of the disclosure are not necessarily limited to the specific architecture depicted by FIG. 1. The system 100 may include a computing system 102, which may be coupled to client devices 104 through a network 106. The computing system 102 may be a cloud-based infrastructure configured, for example, as Software as a Service (SaaS) or Platform as a Service (PaaS). In some embodiments, the computing system 102 may be distributed computing system with multiple compute nodes and memory nodes that can be scaled to serve a particular service or application in response to changing workload conditions. The computing system 102 may also be a non-cloud-based system such as a personal computer, a server, one or more servers communicatively coupled through a network, and other configurations.

Each client device 104 may be any suitable type of computing device or machine that has a programmable processor including, for example, server computers, desktop computers, laptop computers, tablet computers, smartphones, etc. In some examples, each of the client devices 104 may include a single machine or multiple interconnected machines (e.g., multiple servers configured in a cluster).

The network 106 may be a public network such as the Internet, a private network such as a local area network (LAN) or wide area network (WAN)), and combinations thereof. In some embodiments, the network 106 may include a wired and/or wireless infrastructures provided by one or more wireless communications systems, such as a WiFi hotspot connected with the network 106 and/or a wireless carrier system that can be implemented using various data processing equipment, communication towers (e.g. cell towers), etc. In some embodiments, the network 106 may be an L3 network. The network 106 may carry communications (e.g., data, message, packets, frames, etc.) between the computing system 100 and the client devices 104.

The computing system 102 can include one or more processing devices 108, memory 110, and storage 112 used to implement the techniques described herein. The processing devices may include central processing units (CPUs), graphical processing units (GPUs), application specific integrated circuits (ASICs), and other types of processors. The memory 110 serves as the main memory or working memory used by the processing devices 108 to store data and computational results. The memory 110 may include volatile memory devices such as random-access memory (RAM), non-volatile memory devices such as flash memory, and other types of memory devices. In certain implementations, main memory 110 may be non-uniform access (NUMA), such that memory access time depends on the memory location relative to processing device 108. Storage 112 may a persistent (e.g., non-volatile) storage device or system and may include one or more magnetic hard disk drives, Peripheral Component Interconnect (PCI) solid state drives, Redundant Array of Independent Disks (RAID) systems, a network attached storage (NAS) array, and others. The storage device 112 may be configured for long-term storage of data and programming used to implement the techniques described herein. It will be appreciated that the processing device 108, memory 110, storage 112 may each represent a monolithic/single device or a distributed set of devices. For example, the processing devices 108, memory 110, and/or storage 112 may each include a plurality of units (e.g., multiple compute nodes, multiple memory nodes, and/or multiple storage nodes) networked together within a scalable distributed computing system. Additionally, the computing system 102 may have additional hardware components not shown in FIG. 1. The client devices 104 may include similar architectures.

The computing system 100 may be configured to store historical transaction data 118. The historical transaction data 118 may include past sales transactions between sellers and purchasers. The transactions may include a variety of data related to any number of transactions between any number of sellers and purchasers. As used herein, the term "client" refers to the seller of a product or a service, and the term "customer" refers to the purchaser or potential purchaser of the product or the service.

As used herein, the term resource refers to limited and perishable supply with a limited time to expiration (to book the capacity) such as airline flights, cargo shipments, hotel stays, theater tickets, and others. The client may use the system 100 to, for example, receive a pricing recommendation or identify an optimal pricing strategy for a product which requires capacity from a resource or a plurality of resources, based on estimated opportunity cost(s) of using the resource(s).

The historical transaction data 118 may record transactions relating to a wide variety of resources and may include several years of transaction data. Each transaction may be represented by a plurality of attributes describing characteristics of the transaction and characteristics of the resources involved in the transaction. The attributes may include the quantity of capacity reserved, total transaction price, time of the transaction (referred to herein as the purchase date or booking date), the time of perishability or expiration of the resource (referred to herein as the resource date), geographical locations, resource identifiers, resource types, and others. The historical transaction data 118 may be stored in the form of one or more databases (e.g., relational database) within storage 112. The historical transaction data 118 may be communicated to the computing system 102 from the client devices 104 and may be regularly updated to ensure that the data is accurate and current.

The model trainer 122 is configured to process the historical transaction data 118 to generate a set of training data 120 and use the training data 120 to generate an opportunity cost model 116, which is configured to generate a predicted opportunity cost for the potential future sale of a specific resource. The generation of the training data 120 may include processing the historical transaction data 118 to clean and validate the data prior to use. Additionally, categorical attributes may be converted to a numerical vector representation, referred to herein as a vector embedding. Generating the training data 120 may also include processing the historical transaction data 118 to generate an opportunity cost proxy as a function of remaining capacity for the resource and the remaining time to expiration of the resource. The process for generating the opportunity cost proxy may include a price proration process and an observation building process, both of which are described further in relation to FIG. 2

Figure 2:
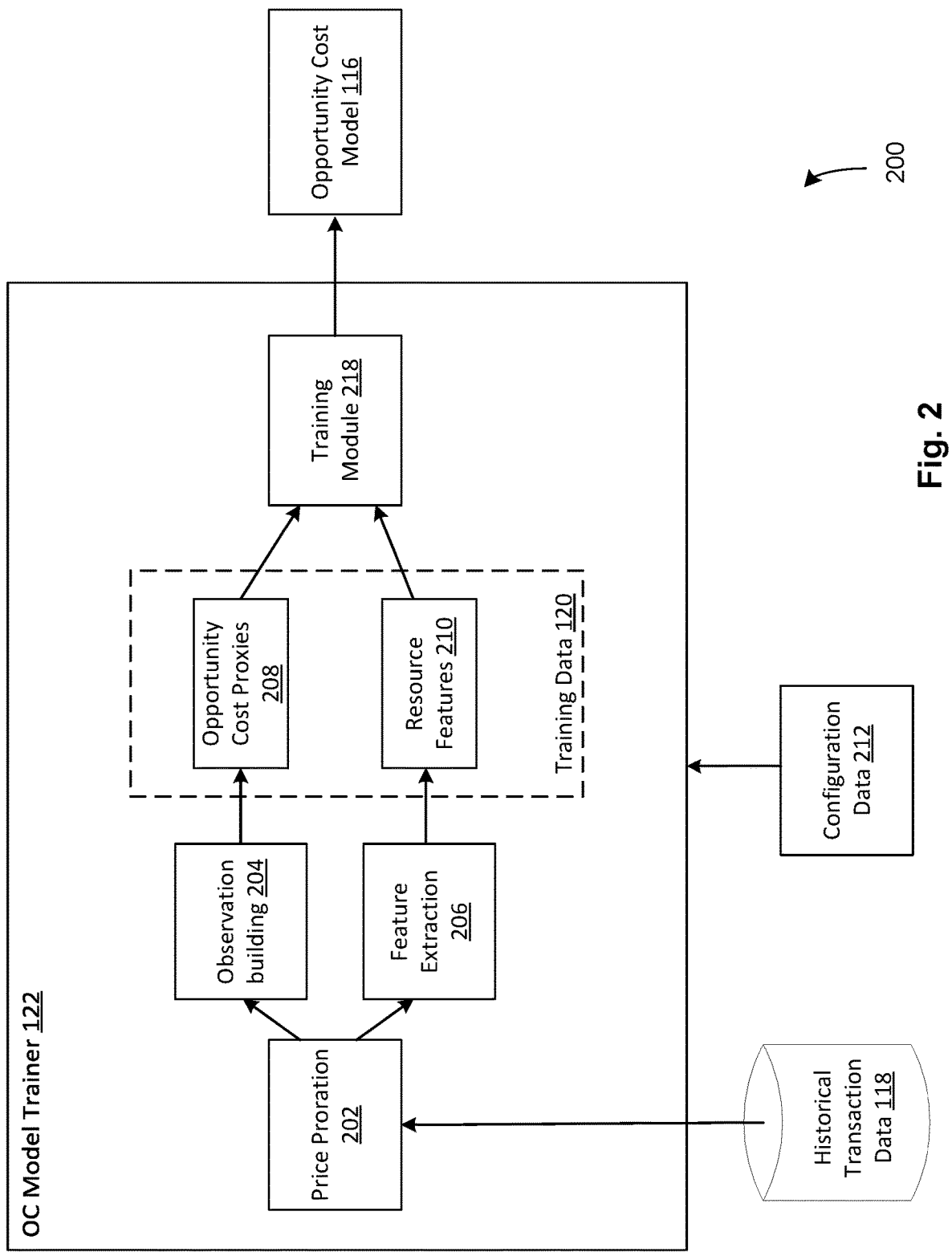
FIG. 2 is a block diagram of a model training system in accordance with some embodiments of the present disclosure.

The opportunity cost model 116 may be any suitable type of artificial intelligence model, machine learning model, artificial neural network, and the like. A more detailed example of a model trainer 122 in accordance with embodiments is shown in FIG. 2. Example techniques for training an opportunity cost model are described in relation to FIG. 4.

The trained opportunity cost models 116 may be used to generate one or more predicted opportunity costs in response to requests received from the client devices 104. Client requests may be received through the user interface 124, which may be a Web server, Application Programming Interface (API), and others. In some embodiments, the client request may be a pricing request, in which case the request handler 126 may first generate a predicted opportunity cost. The predicted opportunity cost may be input to a pricing engine 114 to generate one or more price recommendations responsive to the client request. The pricing engine 114 may use any suitable techniques to generate the price recommendation based in part on the predicted opportunity cost. Techniques for generating price recommendations based on the predicted opportunity costs are outside the scope of the present disclosure. Additionally, in some embodiments, the client request may be a request for a predicted opportunity cost, which is provided to the client directly, with or without an accompanying pricing recommendation. For purposes of the present disclosure, the term opportunity cost (OC) request may refer to a request generated by the request handler 126 in response to a pricing request received from the client or in response to a request for a predicted opportunity cost received from the client.

The OC request may also include various information relevant to a potential future transaction, such as the remaining capacity, the booking date (e.g., date of purchase), the resource date (e.g., flight departure date, shipping date, event date), and other attributes relevant to the resource involved in the transaction. In some embodiments, OC requests may also be processed in accordance with a real-time scoring process. Real-time scoring may be used to generate a real-time response to an OC request for one or more resources based on the actual remaining capacity and the actual time remaining to expiration for each resource. The real-time scoring process can respond quickly to real-time OC requests and return the predicted opportunity cost(s) to the requesting service or device without the storing the predicted opportunity cost(s). An example of a real-time scoring process is described in relation to FIG. 5.

Additionally, OC requests may be processed in accordance with a batch scoring process. Batch scoring may be used to generate, for one or more resources, a set of opportunity costs pertaining to a set of different transaction dates and different remaining capacities. The set of opportunity costs may be used for pricing a set of available resources (e.g., setting the prices for available seats on a group of different flights). For example, the set of opportunity costs generated responsive to the batch scoring process may be stored for later retrieval responsive to a real-time pricing request. The batch scoring process may be periodically repeated to update the predicted opportunity costs of remaining capacity as the capacity of the resource diminishes and/or as the resource date (i.e., time of expiration) approaches. An example of a batch scoring process is described in relation to FIG. 6.

In response to the OC request, the client may receive a report that includes one or more opportunity cost predictions, and/or one or more recommended prices generated by the pricing engine 114 depending on the type of request. The report may be returned to the client device 104 through the user interface 124 or through another route such as a shared storage device, email delivery, and others.

The training data 120 may be updated as new transaction data is received and added to the historical transaction data 118. For example, the client may report additional transactions periodically or in real time as new transactions are performed. The training data 120 may be periodically retrieved by the model trainer 122, which uses the updated training data 120 to update the opportunity cost model 116. In this way, the opportunity cost model 116 can be refined over time. It will be appreciated that various alterations may be made to the system 100 and that some components may be omitted or added without departing from the scope of the disclosure.

FIG. 2 is a block diagram of a model training system 200 in accordance with some embodiments of the present disclosure. The model training system 200 includes the model trainer 122, which may include price proration module 202, an observation building module 204, a feature extraction module 206, and a training module 218. The model trainer 122 may be implemented in hardware or a combination of hardware and software and any suitable type of computing architecture including distributed computing systems.

In some embodiments, the model trainer 122 may receive configuration data 212 that specifies various parameters of the model training process. The configuration data may include a list of features in the data to be used for opportunity cost model training and prediction, a list of features to be used in price proration, quantity buckets to be used as breakpoints for remaining capacity values (e.g., when quantity is continuous), days prior groupings to be used as groupings of days remaining to the resource date, a list of features to be used in scaling of the prices, and others.

As described in relation to FIG. 1, the model trainer 122 processes the historical transaction data 118 to generate the opportunity cost model 116. Each entry in the historical transaction data 118 may include a set of attributes that capture information relevant to that particular transaction. Some attributes may be resource-specific attributes that remain fixed throughout the life of the resource. For example, in the context of airline flights, the resource-specific attributes may include the origination and destination information for each leg of the flight, the date of departure (e.g., resource date), the type of seat (e.g., first class, coach, etc.), type of aircraft, and others. Some attributes may be transaction-specific attributes, which may vary across different transactions for the same resource. For example, transaction-specific attributes may include the total transaction price, the time of the transaction (i.e., booking date), and others. Some attributes, such as the time to expiration may be derived from other attributes stored in the historical transaction data 118.

Although not shown, the model trainer 122 may clean and validate the historical transaction data 118 prior to use. For example, the historical transaction data 118 may be processed to correct or eliminate data that appears to be in error, such as statistical outliers or misspellings, for example. The model trainer 122 may also rescale and/or reformat attributes to a consistent scale and format (e.g., same date format, same monetary unit, etc.).

The cleaned and prepared data may then be processed the price proration module 202, which converts the transaction data to a level that corresponds with individual resources. A single transaction recorded in the historical transaction data 118 may include a combination of resources. For example, a transaction recorded for an airline booking may involve two or more connecting flights, each of which may be considered a different resource. However, the price recorded for the transaction may reflect the overall price for the flight from origin to destination. For each such transaction, the price proration module 202 translates the prices into prorated transactions with resource-level prices. This ensures that the opportunity cost proxy used to train the opportunity cost model 116 is at the resource level (e.g., individual flights for passenger airline), which is the level at which the capacity is managed. The relative contribution of each resource in a transaction to the overall price may be included in the transaction attributes (e.g., proration weights, individual resource prices, etc.), inferred from the transaction attributes (e.g., relative travel distances between two flights), or determined from other data such as the average cost of each resource over a large number of transactions.

For each prorated transaction, a time remaining to the resource date (e.g., time to departure) may be calculated and associated with the prorated transaction. The time remaining to the resource date may be computed as the number of days between the resource date (e.g., flight departure date) and the booking date for the transaction. The time remaining to the resource date may be referred to herein as the "days prior" value. In some embodiments, the days prior value for each transaction may be mapped to a set of days prior groupings, which are groupings of adjacent days remaining to the resource date. Days prior groupings can be used to specify a different time interval for the opportunity cost proxy used to the train the opportunity cost model 116. However, it will be appreciated that the days prior grouping may be specified as a single day, in which case the days prior grouping and the days prior value may be the same. The number of days in a days prior grouping may be specified by the configuration data 212 provided to the model trainer 122.

In some embodiments, the prices for each prorated transaction may also be scaled by dividing the prorated transaction price by a normalizing value, which may vary depending on the business context. This enables the price information to be represented in a uniform way across a broad range of different transactions so that the opportunity cost model 116 can be trained to be generally applicable across a diverse range of resource types. For example, the normalizing factor may be the average unit price of the resource across a plurality of transactions. In some embodiments, a metric or level such as a list of a subset of resource attributes for determining the normalization factor may be specified by configuration data provided to the model trainer 122. Additionally, outliers may be removed from or adjusted in the prorated transactions data to remove or adjust abnormal pricing information that would otherwise skew the results of the model training process. Any suitable statistical technique may be used to detect outliers.

The prorated transactions may then be processed by the observation building module 204 and the feature extraction module 206 to generate the training data 120. The feature extraction module 206 generates resource features 210, which are features generated from resource-specific attributes (e.g., flight origination, flight destination, the type of seat, type of aircraft, etc.). Each resource feature 210 may be a numerical representation of an attribute suitable to be used as input to a neural network (e.g., scalar, n-dimensional vector).

The resource features 210 may include continuous features and/or categorical features. Continuous features are features that represent continuous numerical attributes such as quantities (e.g., distance of the flight, storage capacity of a storage unit, geographical coordinates of an airport or other location, remaining cargo weight capacity or seat capacity), dates, and times. Continuous features may be generated by normalizing continuous attributes to a value within a specified range. Various feature scaling techniques may be used to normalize the data, including min-max normalization, mean normalization, quantile mapping, and others.

Categorical features are features that represent categorical attributes such as geographical locations, airport codes, seating class, aircraft type, name of a theater or arena, name of an event or sports team, and others. Categorical features may be generated using a vector embedding technique, which is able to convert textual information to a vector representation, i.e., n-dimensional vector with an array of n elements, where each element is a number with a value within a specified range between a minimum and maximum value (e.g., between 0 and 1). In vector embedding, the degree of similarity between any two vectors reflects the degree of similarity between the underlying attributes. Thus, the vector embeddings are able to capture semantic relationships and similarities in the categorical attributes. For example, vectors generated for the attributes "Dallas" and "Houston" would be expected to be relatively similar compared a vector generated for the attribute "New York." In this way, similar categorical attributes will tend to produce similar categorical features and have a similar effect on the opportunity cost model 116.

In some embodiments, the resource features may also include time related features that are dependent on the resource date and/or the booking date. The time related features may be configured to capture trend and/or seasonality effects exhibited by the historical transaction data. Trend features are features that reflect any long-term changes in historical opportunity cost proxies over time that are not a result of seasonal effects (e.g., inflation). In some embodiments, trends may be captured using a time measurement such as day number or week number as a trend feature.

Seasonality features are features that reflect changes in historical opportunity cost proxies that occur periodically from year to year. In some examples, seasonality features may be captured by using a Fourier series filter as a seasonality feature. The Fourier series filters may be used to extract specific frequency components from the historical data. Any number of Fourier series filters may be designed to identify and extract periodic fluctuations that tend to occur at certain specified intervals, such as weekly, monthly, quarterly, yearly, and others. Some seasonality features may be more detectable if 1.5 years or more of historical data is available.

In some embodiments, a subset of the available resource attributes in the historical transaction data 118 are used to train the opportunity cost model 116. This subset of attributes may be selected based on expert knowledge and/or experimentation. For example, in some cases, it may be apparent that prices are not very sensitive to a particular resource attribute (e.g., aircraft type). Such resource attributes may be disregarded for training the opportunity cost model 116. In some embodiments, the subset of resource attributes used to train the opportunity cost model 116 may be specified by the configuration data 212.

The observation building module 204 generates the opportunity cost proxies 208 from the prorated transactions. The opportunity cost proxies 208 may be generated for each resource as a function of remaining capacity and remaining time (e.g., days prior or days prior groupings). The remaining capacity may be proxied using the cumulative quantity from the quantities provided in the historical prorated transaction data 118 for that resource. Opportunity cost represents the expected loss of future revenue due to the use of existing capacity now rather than reserving it for future use. The true opportunity cost for a transaction (at the resource level) depends on the price that a hypothetical buyer would be willing to pay for the resource, the probability that such a hypothetical buyer exists, and the probability that the hypothetical future buyer cannot be served if a unit of capacity is used now, given the remaining capacity of the resource and the days prior (i.e., days remaining to the resource date.) However, many of these factors depends on the future demand for the resource at the time of the transaction, which is probably not known or recorded in the transaction data. Accordingly, the opportunity cost model 116 is trained using the opportunity cost proxies 208, which provide an estimate of the actual opportunity costs.

To generate the opportunity cost proxies 208, the historical transaction data 118 is used to directly estimate the value of each unit of inventory for a given resource at any given time to expiration (e.g., time to departure). For ease of illustration, the present description sometimes uses the example of airline flights. However, it will be appreciated that the following process may be used for any type of limited and perishable resource.

In this example, the resource is a single flight leg across multiple departures, where $P=\{P^1, P^2, \ldots, P^{|I|}\}$ and $T=\{T^1, T^2, \ldots, T^{|I|}\}$ represent the sequence of vectors corresponding to the booked prices and the time-to-departure for each booking $i \in I=\{1, 2, \ldots, |I|\}$ in the historical transaction data 118, wherein $|I|$ represents the total number of booking recorded for that flight. The components of the vectors $P^i=[p_1^i, \ldots, p_n^i, \ldots, p_{N^i}^i]^T$ and the vectors $T^i=[t_1^i, \ldots, t_n^i, \ldots, t_{N^i}^i]^T$ hold the price and time information for all bookings. For the ith flight, $N^i$ represents the total number of bookings, $p_n^i$ is the price, and $t_n^i$ is the time-to-departure for the nth booking on that flight. Note that $t_1^i > t_2^i > t_{N^i}^i$ by definition. The time-to-departure may be recorded as days prior or as a days prior grouping so the data in T can be in any time units or clustering of time periods. The observation building module 204 uses this information to generate the opportunity cost proxies 208 from historical data P and T. The resulting opportunity cost proxies 208 may be represented as an opportunity cost proxy matrix (OCP matrix), $B=[b(x, t)]$, where $b(x, t)$ is the opportunity cost proxy for the remaining capacity of x at the remaining time of t.

To generate the OCP matrix, a set of data collection points (DCPs) are determined from the prorated transaction data. The DCPs divide the booking horizon into discrete time intervals that strike for a correct level of aggregation. Each DCP refers to a time interval, such as a days prior or days prior grouping, included in the transaction data for a particular resource type. For each DCP, a vector of historical prices realized for a particular resource type is generated as a function of time remaining to expiration (e.g., time to departure). The DCPs for a given historical data may be represented as $D=[d_1, d_2, \ldots, d_{|D|}]$ wherein $d_j$ is the time to departure (days prior or days prior grouping), and wherein $d_1 > d_2 > d_{|D|}$. The time to departure, $d_j$, may be thought of as a time window that is used to determine which historical prices are included for each DCP. For each DCP, $d_j \in D$, a subset of prices $P_{\leq d_j}^i$ is constructed from the vector $P^i$, such that $P_{\leq d_j}^i = \{P_1^i | T_1^i \leq d_j\}$. In other words, only the subset of prices that were realized from DCP $d_j$ until departure are considered for constructing the vector $P_{\leq d_j}^i$. Any prices that correspond with transactions that occurred outside of the time window of the DCP (i.e., prior to time $d_j$) are excluded from the vector of prices, $P_{\leq d_j}^i$. This is in line with the fact that to determine the opportunity cost (e.g., revenue opportunity of any remaining capacity) at a given DCP $d_j$, all future demand from that point on needs to be considered.

After constructing $P_{\leq d_j}^i$ for all $d_j \in D$, each $P_{\leq d_j}^i$ is transformed into a vector $\tilde{P}_{\leq d_j}^i$ by sorting and zero-padding. The sorting and zero padding transforms the vector $P_{\leq d_j}^i$ into a new sorted vector of opportunity cost proxies, $\tilde{P}_{\leq d_j}^i$, where the prices are ordered in decreasing order, and any remaining capacity up to C is filled with zero. This process would be applied to all flights in I independently.

As a result of the sorting and zero-padding process, the prices in $\tilde{P}_{\leq d_j}^i$ will be ordered so that the highest historical price within the subset $P_{\leq d_j}^i$ corresponds with the lowest capacity level, the next highest price within the subset $P_{\leq d_j}^i$ corresponds with the next lowest capacity level, and so on. If the capacity exceeds the number of bookings from the historical price data, the remaining capacity levels in $\tilde{P}_{\leq d_j}^i$ are set to zero. This can be illustrated by considering a single flight i from the historical transaction data with capacity C, and the corresponding sales data for the flight, $P^i = [p_1^i, \ldots, p_n^i, \ldots, p_{N^i}^i]$ from the historical transaction data 118. To estimate the revenue opportunity, the highest price from $P^i$ is selected as the opportunity cost proxy for the case where only one seat is left in inventory since the goal is to maximize revenue and since the opportunity cost of a resource will generally be expected to be highest when the remaining capacity is lowest. Similarly, if the remaining capacity is two seats, the two transactions with the highest prices from $P^i$ are selected as the opportunity cost proxies. If the total capacity (e.g., number of seats) exceeds the total number of actual bookings recorded in the historical transaction data for that flight, $C > N_i$, the opportunity cost proxy—for any number of remaining seats in the range $\{N_i+1, \ldots, C\}$ is set to zero, as seats which are not booked generate zero value.

The observation building algorithm shown in FIG. 3 is a pseudocode representation of the observation building process described above. A specific example of the observation building process is described for a capacity of five (C=5) and two flights (I={1, 2}) with corresponding price data, P={[90, 70, 80], [80, 90, 70, 70]} and time-to-departure data T={[2, 2, 0], [2, 2, 1, 0]}. It will be appreciated that the two flights correspond with a same type of resource, i.e., same departure and arrival locations, same seat class, etc. For the sake of simplicity, each days-prior to departure recorded in the time remaining data is treated as a separate DCP, hence D=[2, 1, 0]. However, it will be appreciated that a different days-prior grouping would result in different time units for each DCP. Following the process described above, the transformed matrices for each flight are given by the following OCP matrices:

$$\tilde{P}^1 = [P_{\leq 2}^1 \quad P_{\leq 1}^1 \quad P_{\leq 0}^1] = \begin{bmatrix} 90 & 80 & 80 \\ 80 & 70 & 0 \\ 70 & 0 & 0 \\ 0 & 0 & 0 \\ 0 & 0 & 0 \end{bmatrix}$$

$$\tilde{P}^2 = [P_{\leq 2}^2 \quad P_{\leq 1}^2 \quad P_{\leq 0}^2] = \begin{bmatrix} 90 & 70 & 70 \\ 80 & 70 & 0 \\ 70 & 0 & 0 \\ 70 & 0 & 0 \\ 0 & 0 & 0 \end{bmatrix}$$

for flight two.

Note that for each DCP, the prices that were incurred on and after that DCP are included in the corresponding vector for that DCP and sorted in decreasing order and indexed accordingly. In other words, for the time-remaining dimension, the historical data used to derive the opportunity cost proxy is limited to a subset of historical prices, $P_{\leq d_j}^i$, that were booked within the same time period, i.e., the same number of days prior or less. From that subset of historical prices, the prices are ordered so that the highest historical price within the subset corresponds with the lowest capacity level, the next highest price corresponds with the next lowest capacity level, and so on. If the maximum capacity exceeds the number of bookings from the historical transaction data 118, the remaining capacity levels are set to zero.

To make the data suitable for use by the training module 218, the price values may be arranged in a single column vector, Y, and a covariate matrix, X, may be generated that contains the remaining capacity and the DCP index (i.e., time remaining) for each opportunity cost proxy. An example vector, Y, and a covariate matrix, X, for the above example are shown below.

$$X = \begin{bmatrix} 2 & 1 \\ 2 & 2 \\ 2 & 3 \\ 2 & 4 \\ 2 & 5 \\ 1 & 1 \\ 1 & 2 \\ 1 & 3 \\ 1 & 4 \\ 1 & 5 \\ 0 & 1 \\ 0 & 2 \\ 0 & 3 \\ 0 & 4 \\ 0 & 5 \\ 2 & 1 \\ 2 & 2 \\ 2 & 3 \\ 2 & 4 \\ 2 & 5 \\ 1 & 1 \\ 1 & 2 \\ 1 & 3 \\ 1 & 4 \\ 1 & 5 \\ 0 & 1 \\ 0 & 2 \\ 0 & 3 \\ 0 & 4 \\ 0 & 5 \end{bmatrix}, Y = \begin{bmatrix} 90 \\ 80 \\ 70 \\ 0 \\ 0 \\ 80 \\ 70 \\ 0 \\ 0 \\ 0 \\ 80 \\ 0 \\ 0 \\ 0 \\ 0 \\ 90 \\ 80 \\ 70 \\ 70 \\ 0 \\ 70 \\ 70 \\ 0 \\ 0 \\ 0 \\ 70 \\ 0 \\ 0 \\ 0 \\ 0 \end{bmatrix}$$

Vector Y represents the set of opportunity cost proxies 208 and matrix X is a corresponding covariate matrix. The first column of covariate matrix X represents time remaining, t, in terms of the DCPs, $d_j$, and the second column represents the generated capacity proxy for the remaining inventory, x. The vector Y and covariate matrix X may be referred to collectively as the OCP matrix, B=[b(x, t)]. A separate OCP matrix may be generated for each resource type and date combination. According, it will be appreciated the example OCP matrix shown above will be associated with a single set of resource features, depending on the applicable resource-specific attributes for that resource type. To cover multiple resources, the covariate matrix X may also contain resource features contained in separate columns.

The resulting training data 120 for a specific resource type will include the resource features 210 for that resource type as well as the opportunity cost proxies 208 for various combinations of remaining capacity and remaining time to expiration. The training data 120 may be divided into a number of training samples. Some of the training data 120 may also be used as testing data, which is used for a validation phase of the training algorithm. The training samples and testing samples may be divided into several batches.

As shown in FIG. 2, the training module 218 uses the opportunity cost proxies 208 and the resource features 210 to train the opportunity cost model 116 to predict an estimated bid price across several different resource types (e.g., different flights) for any given remaining inventory level and time remaining to expiration. In other words, the opportunity cost model is trained to learn an estimated opportunity cost, $\hat{b}(\hat{x}, t)$, given a remaining capacity feature, $\hat{x}$, a time remaining feature, t, and the resource features 210. This creates a mapping from the attributes of a resource to the predicted opportunity cost for the transaction given the resource-specific attributes and values for the remaining capacity and remaining time to expiration. The predicted opportunity cost may then be further used to generate a recommended price or develop a pricing strategy for the resource, or a combination of resources from which a capacity is needed such as a flight itinerary with multiple stops, for example.

In some embodiments, the opportunity cost model 116 is an artificial neural network, such as deep neural network. However, other model types can also be used in accordance with embodiments of the present techniques, including regression models, and others. Techniques for training a neural network are described further in relation to FIG. 4.

It will be appreciated that various alterations may be made to the model trainer 122 described above and that some components may be omitted or added without departing from the scope of the disclosure.

Figure 4:
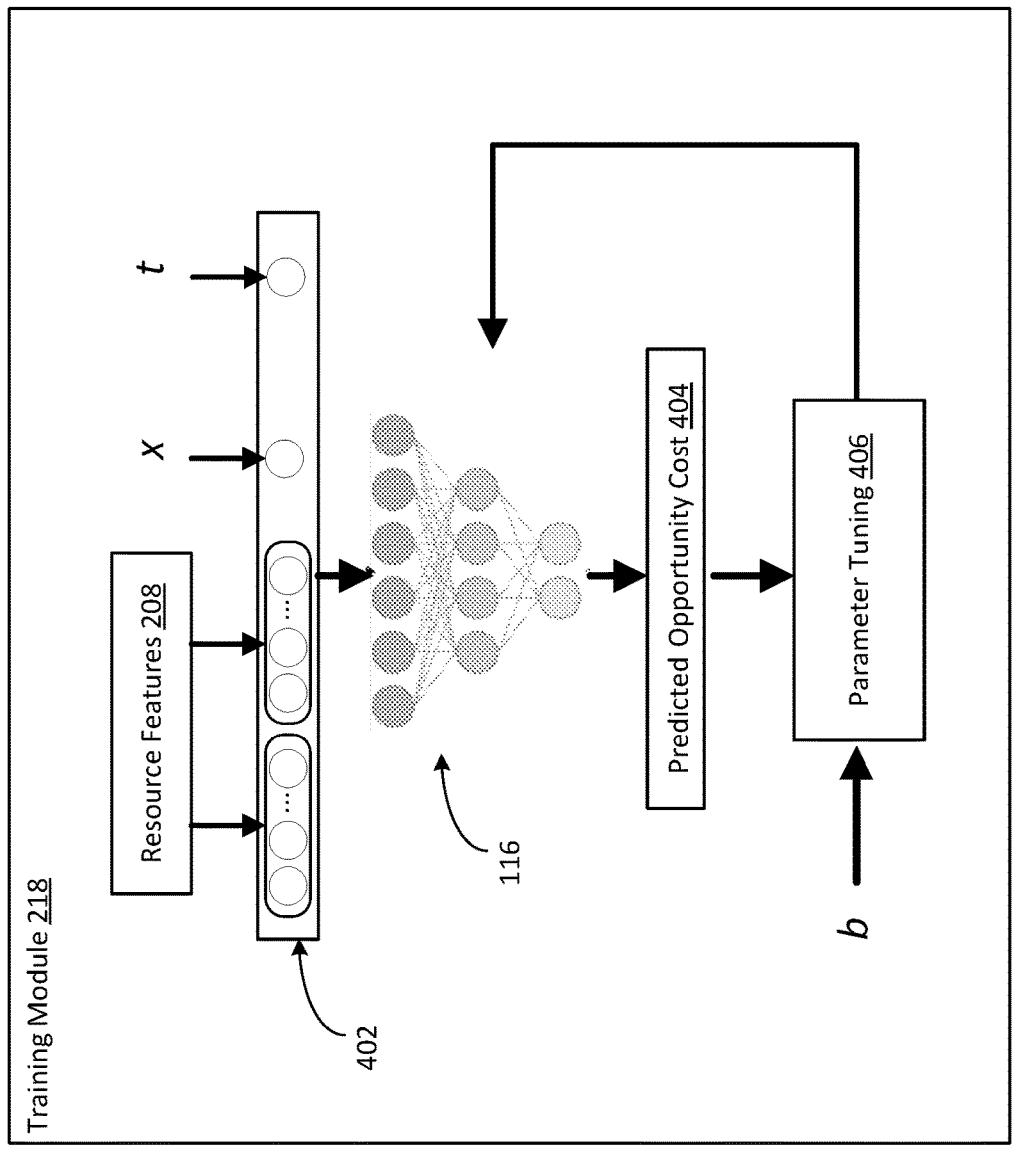
FIG. 4 illustrates an example process performed by the training module in accordance with some embodiments of the present disclosure.

FIG. 4 illustrates an example process performed by the training module 218 in accordance with some embodiments of the present disclosure. In the embodiment shown in FIG. 4, the opportunity cost model 116 is a deep neural network. It will be appreciated that the neural network depicted is merely an exemplary illustration and that embodiments of the present techniques are not limited to a neural network with this specific configuration. The opportunity cost model 116 may include any suitable number of input nodes, hidden layers (including zero hidden layers), nodes per layer, etc. In the following description, specific techniques for training the opportunity cost model 116 are presented. However, it will be appreciated that the techniques described herein are provided as example implementations and that other techniques may be used to train a model to predict estimated opportunity costs without deviating from the scope of the present disclosure.

As described above in relation to FIG. 2, the opportunity cost model 116 is trained using the resource features 210 and the opportunity cost proxies 208, which may be stored in an OCP matrix B=[b(x, t)] generated for each resource type by the observation building module 204. Each opportunity cost proxy from the OCP matrix, B, serves as an observed opportunity cost given the remaining capacity proxy, x, and time remaining, t, obtained from the OCP matrix for that opportunity cost proxy.

At each iteration, the input 402 to the opportunity cost model 116 includes the resource features 210, the remaining capacity proxy, x, and the time remaining, t, for the corresponding opportunity cost proxy, b, from the OCP matrix, B. The output of the opportunity cost model 116 is the predicted opportunity cost 404.

The predicted opportunity cost 404 output by the opportunity cost model 116 and the opportunity cost proxy, b, are input to the parameter tuning module 406, which adjusts the weights and biases of the opportunity cost model 116 based on a comparison of the predicted opportunity cost 404 and the opportunity cost proxy, b. For example, the parameter tuning module 304 may adjust the values of the neural network's weights and biases to minimize a loss function (also known as a cost function or objective function) that characterizes the difference between the neural network's output (the predicted opportunity cost 404) and the desired output (the opportunity cost proxy, b).

The loss function consists of terms that can be calculated based on a comparison of the neural network's output and the corresponding training sample's opportunity cost proxy, which is used as the desired output. For example, the loss function may be a Mean-Squared Error (MSE) function, which may be expressed as follows:

$$\text{Loss} = \frac{\text{Sum}((\text{Actual} - \text{Prediction})^2)}{N}$$

The term Actual in the above function represents the desired output and the term Prediction represents the neural network's output. The Mean-Squared Error measures the average of the squares of the errors or deviations. It is more sensitive to large errors due to the squaring process. The loss function may also be a Mean-Absolute Error (MAE) function as shown below:

Loss=Sum(|Actual−Prediction|)/N

Mean Absolute Error (MAE) measures the average of the absolute errors between the actual and predicted values. It is less sensitive to outliers compared to MSE. Other types of loss functions may be used, including quantiles loss, which is generalizations of MAE, and others. Embodiments of the present techniques are not limited to the specific loss functions described herein, but may be implemented using any suitable loss function including those described herein or others. The neural network may be a feedforward neural network trained using any suitable training algorithm, including backpropagation, a gradient descent algorithm, and/or a mini-batch technique.

In gradient descent techniques, the gradients of the loss function are computed with respect to the parameters (e.g., weight and biases) of the opportunity cost model 116 that generates the predicted opportunity cost 404. The parameters of the opportunity cost model 116 are iteratively adjusted until the opportunity cost model 116 converges on a solution for the current training sample. The above process may be repeated for multiple training samples of the training data 210. Once the opportunity cost model 116 is fully trained on multiple training samples, the opportunity cost model 116 will map the resource features 210, the remaining capacity, x, and the time remaining, t, of a potential future transaction to predicted values of the corresponding opportunity cost.

To generate the neural network, values for the hyperparameters of the neural network may be specified. The hyperparameters may be any parameters that affect the structure of the neural network, such as the number of hidden layers and the number of neurons in each hidden layer, or determine how the neural network is trained, such as the learning rate and batch size, among others. In some embodiments, the hyperparameters may be iteratively adjusted by the model trainer 122.

The process of adjusting the hyperparameters of the network iteratively to minimize training errors is called hyper parameter tuning. For hyperparameter tuning, the training data 120 is divided into a training set and validation set. Hyperparameter tuning in a neural network involves systematically searching through a range of hyperparameter values to find the combination that results in the least error between the predictions generated by the model and the actual observations. This process is crucial for optimizing the neural network's accuracy and efficiency. Key hyperparameters include learning rate, batch size, number of layers, number of neurons per layer, and activation functions. Techniques such as grid search, random search, or Bayesian optimization are employed to explore the hyperparameter space. During this process, each set of hyperparameters is used to train the network, and its performance is evaluated on the validation dataset. The goal is to identify the hyperparameters that minimize a predefined loss function or maximize accuracy, ensuring the model generalizes well to new, unseen data. This systematic approach is essential for enhancing the neural network's predictive capabilities, making it a critical step in the development of robust and effective machine learning models.

Figure 5:
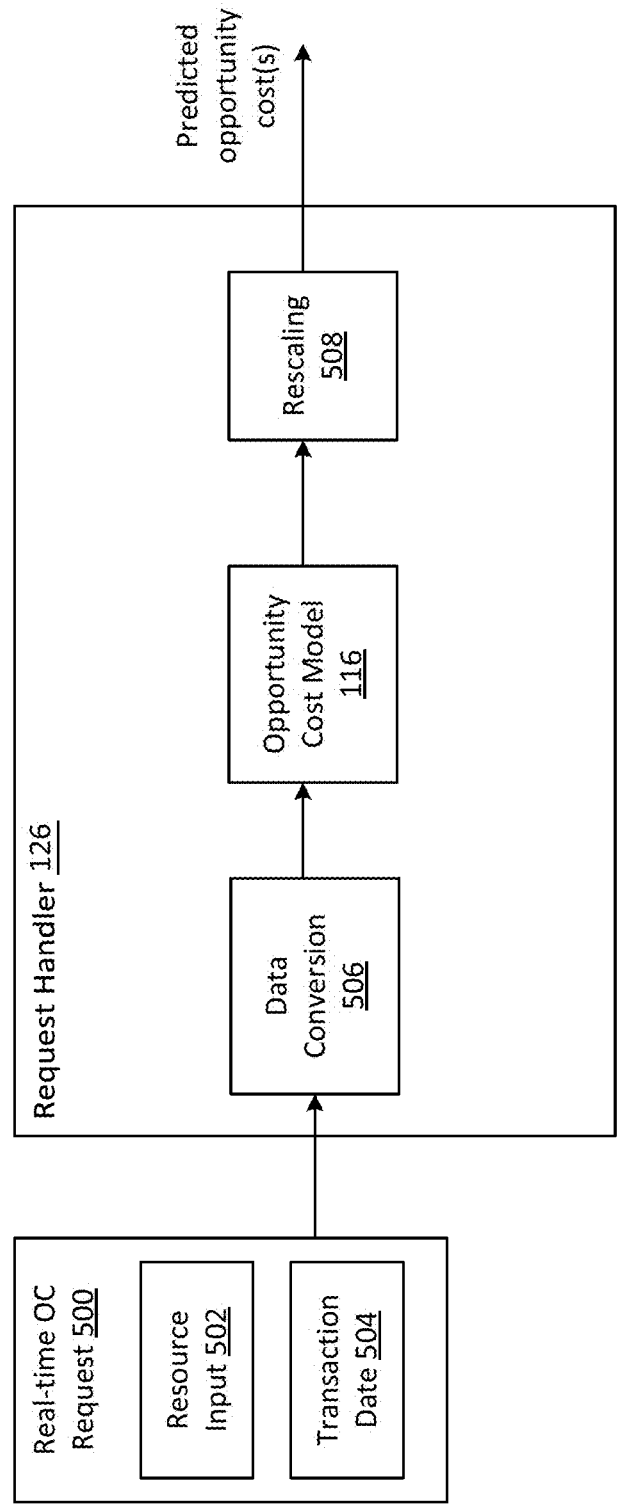
FIG. 5 is a block diagram of an example request handler in accordance with some embodiments of the present disclosure.

FIG. 5 is a block diagram of a request handler 126 in accordance with some embodiments of the present disclosure. The request handler 126 may be implemented in hardware or a combination of hardware a software and any suitable type of computing architecture including distributed computing systems. In the embodiment shown in FIG. 5, the request handler 126 is configured to generate a real-time response to a real-time OC request 500 for one or more resources based on the actual remaining capacity and the actual time remaining to remaining time to expiration.

The resource input 502 specifies the resources associated with the real-time OC request 500 and includes a set of resource-specific attributes for each resource. The resource input 502 may also specify a remaining capacity for each resource (e.g., the remaining number of available seats on a flight) and a resource date (e.g., departure date). The resource input 502 may include a single resource (e.g., a single leg of a future flight) or may include a group of different resources (e.g., several flights with different destination and/or arrival locations, etc.). In some embodiments, the real-time OC request 500 may include a transaction date (e.g., booking date) 504. However, the current time at the time the OC request is received may also be used as the transaction date.

The request attributes are ingested by the data conversion module 506 to generate the input to the opportunity cost model 116. The data conversion module 506 converts the resource-specific attributes to resource features suitable for the neural network using the same process described above for the feature extraction module 206. Specifically, continuous attributes are converted to continuous features using the same feature scaling technique, and categorical attributes are converted to categorical features using the same vector embedding technique.

The transaction date and the resource date are used to determine the time to expiration of the resource in the applicable time unit (e.g., days prior or days prior grouping). The remaining capacity and the time to expiration may also be converted to a feature suitable for input to the opportunity cost model 116.

For each resource, the converted data is then input to the opportunity cost model 116. The output of the opportunity cost model 116 is a predicted opportunity cost of selling the resource given the remaining capacity and the remaining time to expiration. In some embodiments, the predicted opportunity cost might be post-processed to ensure that they satisfy certain desirable properties, particularly that they should be monotonically increasing with larger days prior (keeping remaining capacity constant), and/or that they should be monotonically decreasing with larger remaining capacity (keeping days prior constant). In some embodiments, the opportunity cost output by the opportunity cost model 116 will be a scaled opportunity cost, also referred to herein as an opportunity cost index, since the output of the model will be in this same scale space as the opportunity cost indices used to train the model. Accordingly, the opportunity cost index may be upscaled by the rescaling module 508 using the inverse normalization operation that was used to scale the prices used to train the opportunity cost model 116 as described in relation to FIG. 2, resulting in an actual opportunity cost denominated in the appropriate currency (e.g., an actual dollar amount). For example, the opportunity cost index may be rescaled by multiplying the resulting opportunity cost index by the average price per unit of the resource. These opportunity costs may be returned to the client or used by the pricing engine 114 (FIG. 1) to generate a price recommendation that may serve as a guide to determine an actual offer price for the request that may be consuming a single resource or a plurality of resources.

Figure 6:
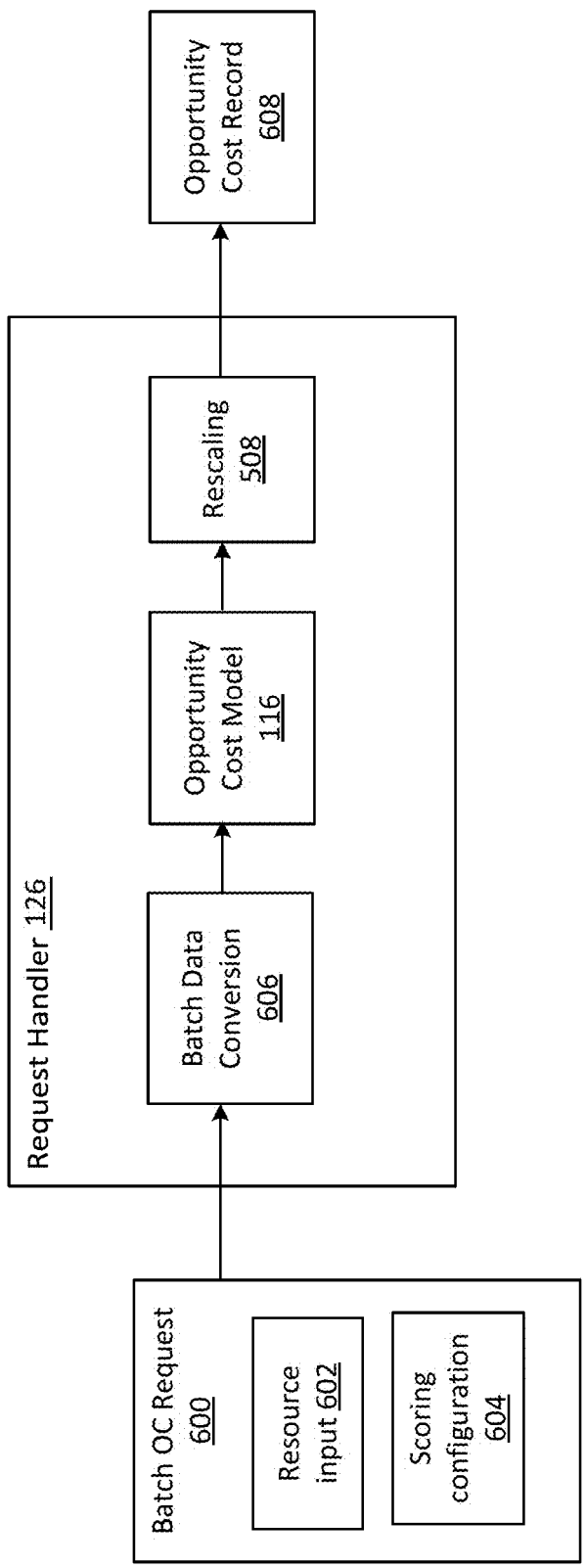
FIG. 6 is a block diagram of another example request handler in accordance with some embodiments of the present disclosure.

FIG. 6 is a block diagram of another example request handler 126 in accordance with some embodiments of the present disclosure. In the embodiment shown in FIG. 6, the request handler 126 performs a batch scoring process to generate a plurality of opportunity costs for one or more resources for a range of remaining capacity levels and one or more transaction dates.

As shown in FIG. 6, the request handler 126 receives a batch OC request 600 which includes the resource input 602 and a scoring configuration 604. The resource input 602 specifies the resources to be used for the batch scoring request and includes a set of resource-specific attributes for each resource. The resource input 602 may also specify a maximum resource capacity for each resource (e.g., the number of available seats on a flight) and a resource date (e.g., departure date). The resource input 603 may include a single resource (e.g., a single leg of a future flight) or may include a group of different resources (e.g., several flights with different destination and/or arrival locations, etc.).

The scoring configuration 604 specifies the parameters to be used for the batch scoring process. For example, the scoring configuration may specify a transaction date (e.g., purchase date) to be used in the scoring process. The scoring configuration may specify a scoring setting that specifies whether to generate opportunity costs for a single date or for multiple dates. The single date setting may be used to indicate that opportunity costs should be generated for the specified transaction date alone (e.g., the current days prior). The multiple date setting may be used to indicate that OC requests should be generated for multiple future days priors or days priors groupings from the specified transaction date to the specified resource date.

The batch data conversion module 606 receives the batch OC request 600 and generates individual OC requests for each resource in accordance with provided configuration. For each resource, the batch data conversion module 606 converts the resource-specific attributes to resource features as described above in relation to the data conversion module 506 of FIG. 5.

The batch data conversion module 606 also generates a set of capacity values to be used for the OC requests. The set of capacity values may span from the maximum capacity of the resource to a minimum remaining capacity (at or above zero) in increments equal to the applicable capacity grouping.

The batch data conversion module 606 may also generate one or more time remaining values to be used for the OC requests, depending on whether the scoring setting is set to single date or multiple date. For the single date setting, the batch data conversion module 606 generates a current time remaining value based on the specified transaction date and the specified resource date. For the multiple date setting, the batch data conversion module 606 generates a set of time remaining values that may span from the current time remaining to zero in increments equal to the applicable time unit (days prior or days prior grouping).

Each combination of the remaining capacity and remaining time may be used to generate OC requests, resulting in multiple OC requests for each resource. Each OC request is input separately into the opportunity cost model 116, which generates a predicted opportunity cost (e.g., opportunity cost index) for each OC request. As described above in relation to FIG. 5, the opportunity cost index output by the opportunity cost model 116 may be upscaled by the rescaling module 508 using the inverse normalization operation that was used to scale the prices used to train the opportunity cost model 116.

The opportunity costs may be stored in batch to as an opportunity cost record 608 that records, for each predicted opportunity cost, the resource type, the capacity remaining used to generate the prediction, and the remaining time used to generate the prediction. The result of this batch scoring process is a record of different opportunity costs predicted for different hypothetical values of capacity remaining and time remaining for one or more resources. The opportunity cost record 608 may be returned to the client or used in the generation of price recommendations. The generation of price recommendations may be performed dynamically using the predicted opportunity cost from the opportunity cost record 608 that corresponds with the remaining capacity and remaining time for the resource at the time of price generation.

Figure 7:
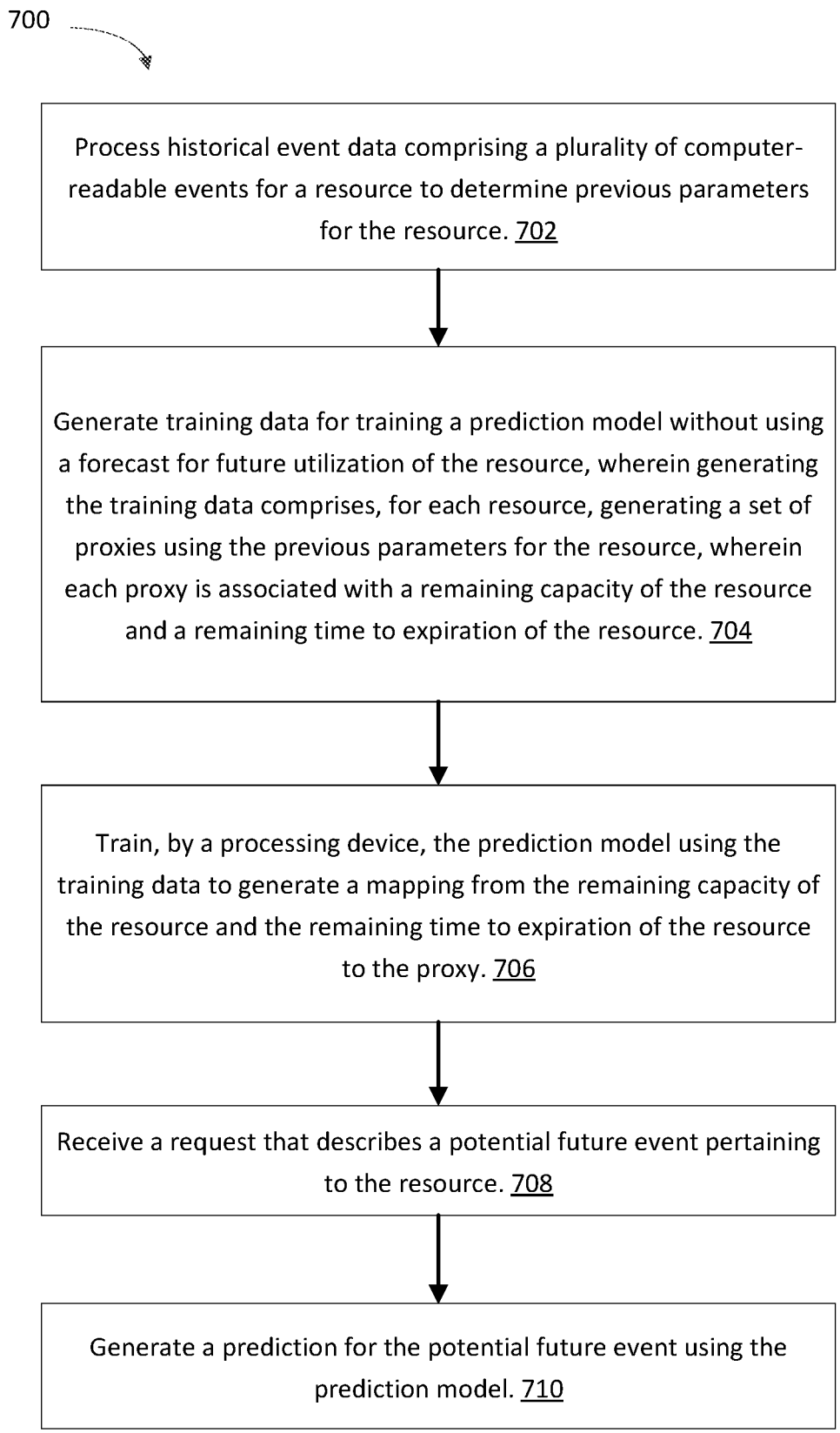
FIG. 7 is a process flow diagram summarizing a method of generating predictions for future events without a forecast for future utilization of the resource, in accordance with some embodiments of the present disclosure.

FIG. 7 is a process flow diagram summarizing a method of generating predictions for future events without a forecast for future utilization of the resource, in accordance with some embodiments of the present disclosure. Method 700 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by the computing system 102 of FIG. 1 or the prediction service 627 shown in FIG. 8. The method may begin at block 702.

At block 702, historical event data comprising a plurality of computer-readable events for a resource is processed to determine previous parameters for the resource. In some embodiments, the event data may be transaction data that describes a plurality of transactions for a resource, and the previous parameters can include a transaction price for the resource and one or more resource-specific attributes. In some embodiments, the historical event data may be prorated into one or more separate prorated events that each describe a single resource, and the previous parameters of the event (e.g., a total transaction price) may be translated to resource level parameters (e.g., the individual prorated price for each resource).

At block 704, training data is generated for training a prediction model without using a forecast for future utilization of the resource, wherein generating the training data comprises, for each resource, generating a set of proxies using the previous parameters for the resource, wherein each proxy is associated with a remaining capacity of the resource and a remaining time to expiration of the resource. The prediction model may be an artificial neural network, such as a deep neural network. In some embodiments, prediction model may be an opportunity cost prediction model which is trained without using a forecast of future demand for the resource. Additionally, the proxy may be an opportunity cost proxy, which is generated using the prorated transaction prices for the resource. Generating the training data may also include converting the one or more resource attributes into one or more resource features.

The process for generating the proxy may performed in accordance with any of the techniques described above in relation to FIGS. 2 and 3. For example, as described above, the proxies may be generated by defining a data collection point associated with a time window that describes an amount of time left to the expiration of the resource, and obtaining a subset of the previous parameters (e.g., prices) for the resource, wherein the subset excludes those of the previous parameters that correspond with events (e.g., transactions) that occurred prior to the time window. The subset of the previous parameters may then be added to a vector and sorted in order from high to low so that a highest value parameter of the subset is associated with a lowest remaining capacity, and a lowest value parameter of the subset is associated with a highest remaining capacity. The vector may be padded with zeros for each vector position that corresponds with a capacity that exceeds a number of transactions for the resource recorded in the historical event data.

At block 706, the prediction model is trained using the training data to generate a mapping from the remaining capacity of the resource and the remaining time to expiration of the resource to the proxy. The training process may also include the resource features so that the opportunity cost prediction model can predict opportunity costs for a plurality of different resource types.

At block 708, a request that describes a potential future event pertaining to the resource is received. For example, the request may be a request for a predicted opportunity cost request for the potential future transaction. The opportunity cost request may be a real-time scoring request or a batch scoring request.

At block 710, a prediction for the potential future event is generated using the prediction model. The prediction may be an opportunity cost prediction, which is generated for the potential future transaction using the trained opportunity cost prediction model. Responses to real-time requests may be transmitted to the device from which the request was received without storing the prediction. Responses to batch requests may be to a record of multiple predictions and indexed according to the corresponding capacity remaining (e.g., units remaining or capacity groupings remaining) and time remaining (e.g., days prior or days prior grouping).

It will be appreciated that embodiments of the method 700 may include additional blocks not shown in FIG. 7 and that some of the blocks shown in FIG. 7 may be omitted. Additionally, the processes associated with blocks 702 through 710 may be performed in a different order than what is shown in FIG. 7.

Figure 8:
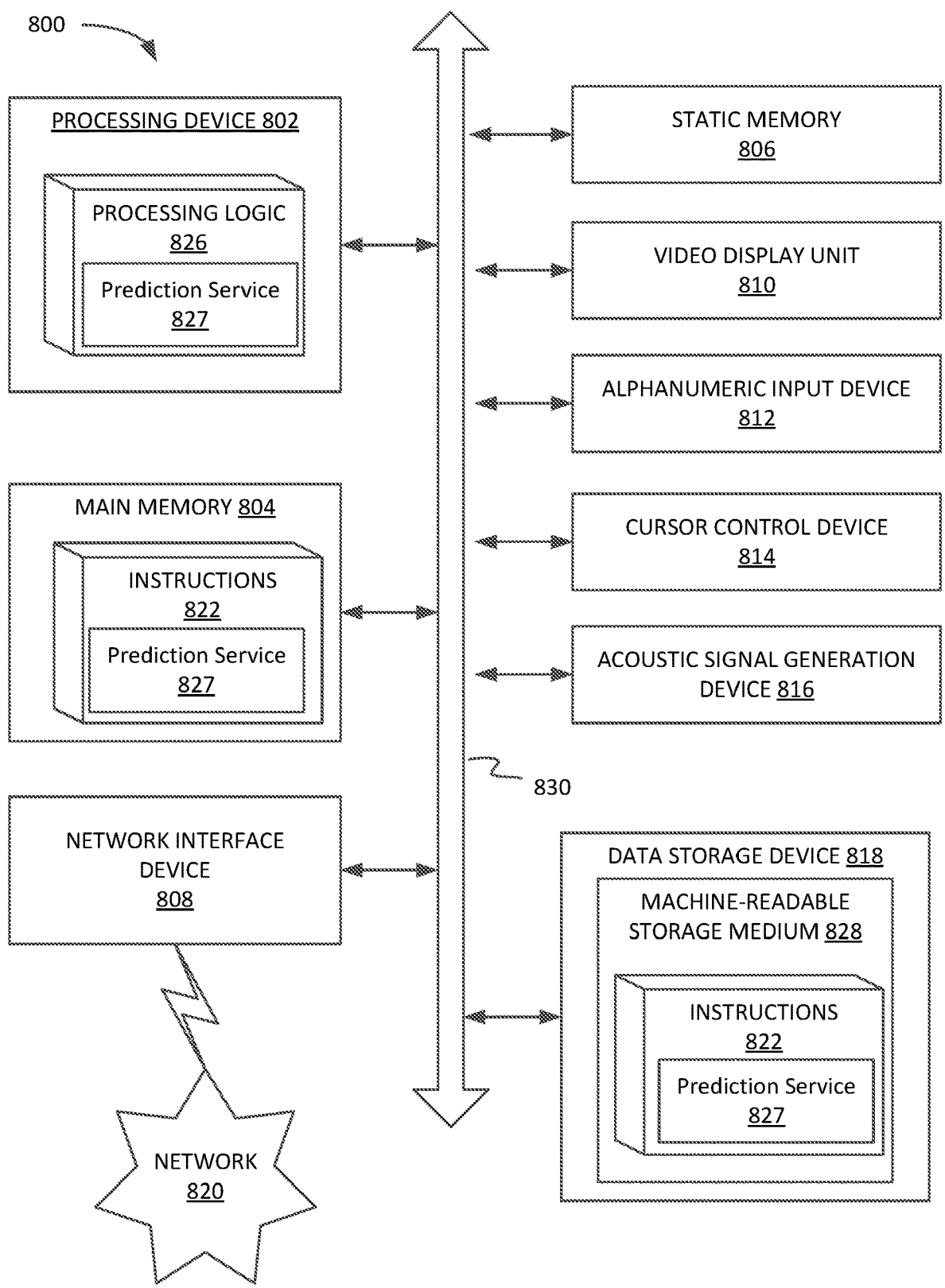
FIG. 8 illustrates a diagrammatic representation of a machine in the example form of a computer system within which a set of instructions, for causing the machine to perform any one or more of the methodologies discussed herein, may be executed.

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a web appliance, a server, and other machines capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server, such as a cloud server, configured as a platform for training neural networks and operating an opportunity cost prediction system as described herein.

The exemplary computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein. For example, the processing logic 826 may include logic for performing the functions of a prediction service 827, such as an opportunity cost prediction service that includes the model trainer 122, the request handler 126, and any of the other components and processes described above in FIGS. 1-6.

The data storage device 818 may include a machine-readable storage medium 828, on which is stored one or more set of instructions 822 (e.g., software) embodying any one or more of the methodologies of functions described herein, including instructions to cause the processing device 802 to perform the functions of the prediction service 827. The instructions 822 may also reside, completely or at least partially, within the main memory 804 or within the processing device 802 during execution thereof by the computer system 800; the main memory 804 and the processing device 802 also constituting machine-readable storage media. The instructions 822 may further be transmitted or received over a network 820 via the network interface device 808.

While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Examples

Example 1 is a method of training an opportunity cost prediction model without the use of a demand forecast. The method includes processing historical transaction data comprising a plurality of transactions for a resource to determine historical prices for the resource. The method also includes generating training data for training an opportunity cost model without using a demand forecast, wherein generating the training data comprises, for each resource, generating a set of opportunity cost proxies using the historical prices for the resource, wherein each opportunity cost proxy is associated with a remaining capacity of the resource and a remaining time to perishability of the resource. The method also includes training, by a processing device, the opportunity cost model using the training data to generate a mapping from the remaining capacity of the resource and the remaining time to perishability of the resource to the corresponding opportunity cost proxy. The method also includes receiving an opportunity cost request that describes a potential future transaction and generating an opportunity cost prediction for the potential future transaction using the trained opportunity cost model. The prediction model may be an artificial neural network, such as a deep neural network.

Example 2 is the method of example 1, wherein processing the historical transaction data comprises, for each transaction of the plurality of transactions that include a plurality of resources: separating the transaction into a plurality of prorated transactions each describing a single resource of the plurality of resources; and translating an overall price of the transaction to resource level prices to be used as the historical prices for each resource.

Example 3 is the method of example 1, wherein generating the set of opportunity cost proxies comprises: defining a data collection point associated with a time window that describes an amount of time left to perishability of the resource; and obtaining a subset of the historical prices for the resource, wherein the subset excludes those historical prices that correspond with transactions that occurred prior to the time window.

Example 4 is the method of example 3, wherein generating the set of opportunity cost proxies further comprises: adding the subset of the historical prices to a vector in order from high to low so that a highest price of the subset is associated with a lowest remaining capacity, and a lowest price of the subset is associated with a highest remaining capacity.

Example 5 is the method of example 4, wherein generating the set of opportunity cost proxies further comprises: padding the vector with zeros for each vector position that corresponds with a capacity that exceeds a number of transactions for the resource recorded in the transaction data.

Example 6 is the method of example 1, wherein generating training data further comprises: generating resource features based on resource-specific attributes of each resource from the historical transaction data, wherein training the opportunity cost model comprises training the opportunity cost model to predict opportunity costs across different types of transactions.

Example 7 is the method of example 1, wherein the OC request is a real-time OC request for a specific capacity remaining input and time remaining input, the method further comprising: transmitting the opportunity cost prediction to a requesting device from which the OC request was received.

Example 8 is the method of example 1, wherein the OC request is a batch OC request for multiple potential remaining capacities, the method further comprising: storing the opportunity cost prediction to a record of multiple opportunity cost predictions.

Examples 1-8 may also be implemented in a system comprising: a memory; and a processing device operatively coupled to the memory, wherein the processing device to perform the actions described in any of examples 1-8.

Examples 1-8 may also be implemented in a non-transitory computer-readable storage medium comprising instructions that, when executed by a processing device, cause the processing device to perform the actions described in any of examples 1-8.

Unless specifically stated otherwise, terms such as "receiving," "configuring," "training," "identifying," "transmitting," "sending," "storing," "adding," "detecting," "processing," "generating" or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Embodiments described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    processing historical event data comprising a plurality of computer-readable events for a resource to determine previous parameters for the resource;
    generating training data to train a prediction model comprising a neural network without using a forecast for future utilization of the resource, wherein generating the training data comprises, for each resource:
        generating a set of proxies using the previous parameters for the resource, wherein each proxy is associated with a remaining capacity of the resource and a remaining time to expiration of the resource;
    training, by a processing device, the prediction model using the training data to generate a mapping from the remaining capacity of the resource and the remaining time to expiration of the resource to a corresponding proxy among the set of proxies;
    receiving, from a client, a request specifying a service that consumes the resource, wherein the request comprises an attribute associated with resource;
    converting the attribute to a feature of the neural network;
    inputting the feature to the neural network;
    generating, by the neural network based on the feature, a real-time response to the request, the real-time response comprising a prediction of an opportunity cost of consumption of the resource; and
    providing, to the client, an offer of the service based on the real-time response.

2. The method of claim 1, wherein processing the historical event data comprises, for each event of the plurality of computer-readable events that include a plurality of resources:
    separating the event into a plurality of prorated events each describing a single resource of the plurality of resources; and
    translating the previous parameters of the event to resource level parameters to be used as the previous parameters for each of the resources.

3. The method of claim 1, wherein generating the set of proxies further comprises:
    adding a subset of the previous parameters to a vector sorted in order from high to low so that a highest value parameter of the subset is associated with a lowest remaining capacity, and a lowest value parameter of the subset is associated with a highest remaining capacity.

4. The method of claim 3, wherein generating the set of proxies further comprises:
    padding the vector with zeros for each vector position that corresponds with a capacity that exceeds a number of transactions for the resource recorded in the historical event data.

5. The method of claim 1, wherein generating training data further comprises:
    generating resource features based on resource-specific attributes of the resource from the historical event data, wherein training the prediction model comprises training the prediction model to generate predictions across different types of transactions.

6. The method of claim 1, further comprising:
    storing the prediction to a record of multiple predictions.

7. A system comprising:
    a memory; and
    a processing device, operatively coupled to the memory, the processing device to:
        process historical event data comprising a plurality of computer-readable events for a resource to determine previous parameters for the resource;
        generate training data to train a prediction model without using a forecast for future utilization of the resource, wherein to generate the training data comprises, for each resource:
            generate a set of proxies using the the previous parameters for the resource, wherein each proxy is associated with a remaining capacity of the resource and a remaining time to expiration of the resource;
        train the prediction model using the training data to generate a mapping from the remaining capacity of the resource and the remaining time to expiration of the resource to a corresponding proxy among the set of proxies;
        receive, from a client, a request specifying a service that consumes the resource, wherein the request comprises an attribute associated with the resource;
        convert the attribute to a feature of the neural network;
        input the feature to the neural network;
        generate, by the neural network based on the feature, a real-time response to the request, the real-time response comprising a prediction of an opportunity cost of consumption of the resource; and
        provide, to the client, an offer of the service based on the real-time response.

8. The system of claim 7, wherein, to process the historical event data, the processing device is to, for each event of the plurality of computer-readable events that include a plurality of resources:
    separate the event into a plurality of prorated events each describing a single resource of the plurality of resources; and
    translate the previous parameters of the event to resource level parameters to be used as the previous parameters for each of the resources.

9. The system of claim 7, wherein, to generate the set of proxies, the processing device is further to:
    add a subset of the previous parameters to a vector sorted in order from high to low so that a highest value parameter of the subset is associated with a lowest remaining capacity, and a lowest value parameter of the subset is associated with a highest remaining capacity.

10. The system of claim 9, wherein, to generate the set of proxies, the processing device is further to:

pad the vector with zeros for each vector position that corresponds with a capacity that exceeds a number of transactions for the resource recorded in the historical event data.

11. The system of claim 7, wherein, to generate training data, the processing device is further to:
generate resource features based on resource-specific attributes of the resource from the historical event data, wherein the processing device is to further train the prediction model to generate predictions across different types of transactions.

12. The system of claim 7, wherein, responsive to the request, the processing device is to:
store the prediction to a record of multiple predictions.

13. A non-transitory computer-readable storage medium comprising instructions that, when executed by a processing device, cause the processing device to:
process historical event data comprising a plurality of computer-readable events for a resource to determine previous parameters for the resource;
generate training data to train a prediction model without using a forecast for future utilization of the resource, wherein to generate the training data comprises, for each resource:
generate a set of proxies using the subset of the previous parameters for the resource, wherein each proxy is associated with a remaining capacity of the resource and a remaining time to expiration of the resource;
train, by the processing device, the prediction model using the training data to generate a mapping from the remaining capacity of the resource and the remaining time to expiration of the resource to a corresponding proxy among the set of proxies;
receive, from a client, a request specifying a service that consumes the resource, wherein the request comprises an attribute associated with the resource;
convert the attribute to a feature of the neural network;
input the feature to the neural network;
generate, by the neural network based on the feature, a real-time response to the request, the real-time response comprising a prediction of an opportunity cost of consumption of the resource; and
provide, to the client, an offer of the service based on the real-time response.

14. The non-transitory computer-readable storage medium of claim 13, wherein the instructions that cause the processing device to generate the set of proxies further cause the processing device to:
add a subset of the previous parameters to a vector sorted in order from high to low so that a highest value parameter of the subset is associated with a lowest remaining capacity, and a lowest value parameter of the subset is associated with a highest remaining capacity; and
pad the vector with zeros for each vector position that corresponds with a capacity that exceeds a number of events for the resource recorded in the historical event data.

15. The non-transitory computer-readable storage medium of claim 13, wherein the instructions that cause the processing device to generate training data further cause the processing device to:
generate resource features based on resource-specific attributes of the resource from the historical event data, and further train the prediction model to generate predictions across different types of transactions.

* * * * *